United States Patent [19]

Call et al.

[11] Patent Number: 5,268,893
[45] Date of Patent: Dec. 7, 1993

[54] WRITE POWER CALIBRATION UTILIZING LEAST SQUARES FIT OF READ-BACK SIGNALS FOR MOVING MEDIA MEMORY

[75] Inventors: David E. Call; Lawrence D. Tipton, both of Tucson, Ariz.

[73] Assignee: International Business Machines Corporation, Armonk, N.Y.

[21] Appl. No.: 779,440

[22] Filed: Oct. 18, 1991

[51] Int. Cl.$^5$ .............................................. G11B 7/00
[52] U.S. Cl. ..................... 369/116; 369/54; 369/56; 369/48
[58] Field of Search ............. 369/116, 54, 56, 48, 369/121, 122, 50, 53, 100, 47, 13, 43, ; 250/205

[56] References Cited

U.S. PATENT DOCUMENTS

| | | | |
|---|---|---|---|
| 3,988,531 | 10/1976 | Laub . | |
| 4,142,208 | 2/1979 | Oprandi et al. | 358/127 |
| 4,549,288 | 10/1985 | Chan | 369/48 |
| 4,562,567 | 12/1985 | Frankfort et al. | 369/106 |
| 4,631,713 | 12/1986 | Romeas et al. | 369/54 |
| 4,731,773 | 3/1988 | Lewkowicz | 369/59 |
| 4,937,440 | 6/1990 | Hofer et al. | 250/201.5 |
| 5,134,606 | 7/1992 | Sekiguchi et al. | 369/116 |

FOREIGN PATENT DOCUMENTS 0045117 of 0000 European Pat. Off. .
0116204 of 0000 European Pat. Off. .

Primary Examiner—Paul M. Dzierzynski
Assistant Examiner—Jim Beyer
Attorney, Agent, or Firm—Andrew J. Dillon; Paul W. O'Malley

[57] ABSTRACT

Calibration of the write signal power level applied to a transducer for marking a moving media to optimize a later recovered read-back signal is provided. An optimized read-back signal is one where the peak-to-peak amplitude of the read-back signal is maximized. The method provides marking test patterns on the recording media at a plurality of discrete, selected write signal power levels of the marking source, developing a read-back signal from the test pattern marks, correlating portions of the read-back signal with the write signal power levels and solving a relationship of the form $$W_c = W_o - KB_2/2B_3$$

where $W_c$ is the calibrated write signal power level $W_o$ is an offset write signal power level. K is a minimum differential between write signal power levels $B_2$ and $B_3$ are parameters derived from a least squares fit of a second order polynomial equation to data provided by correlating read-back signals with write signal power levels.

20 Claims, 4 Drawing Sheets

WRITE POWER CALIBRATION UTILIZING LEAST SQUARES FIT OF READ-BACK SIGNALS FOR MOVING MEDIA MEMORY

FIELD OF THE INVENTION

1. Field of the Invention

The invention relates to improved recovery of information recorded on moving media and, more particularly, to calibration of write power applied to a marking transducer used to record information on moving media to improve later recovery of the information represented by the marks. Still more particularly, the invention relates to calibration of write power applied to a laser in a magnetooptic disk drive to maximize peak to peak amplitude of a subsequent read-back signal.

2. Description of the Prior Art

Computer memory is where programs and work files reside as digital data. Computer memory can include either, and commonly includes both, moving media memory and non-moving type memory. Non-moving memory is typically directly addressed, or accessed, by the computer's central processing unit. Moving media memory, such as disk drives and magnetic tape, is indirectly accessed.

Moving media memory typically has much greater data storage capacity than directly addressed memory and has much longer access times. Moving media memory is also typically not volatile. This is, the data survives turning the computer off. Non-moving type memory is typically faster and more expensive per unit of memory than moving media memory, and has less capacity. Moving media memories are generally used for long-term storage of large programs and substantial bodies of information, such as a data base files, which are not in constant use by the computer, or which are too bulky to provide short term direct access memory capacity for.

The storage media of moving media memories are physically alterable objects. That is to say, they can be magnetized, grooved, pitted or marked in some detectable fashion to record information. Preferably the storage media is at the same time physically resilient, portable, cheap, of large capacity, and resistant to accidental alteration. An example of an analogous medium is a phonograph record wherein a wavy spiral groove represents an analog information signal. The various species of storage media used in moving media memory for computers include magnetic tape, floppy disks, compact disk-ROM, Write Once, Read-Many optical disks and, erasable magneto-optic disks. Each of these storage media exhibit detectable physical changes to the media representing binary data. To read, and where applicable to erase and write data to the media, mechanical apparatuses are provided which can be directed to the proper location on the physical media to carry out the desired function.

Magneto-optic storage disks are similar in appearance to optical compact disks used for storing recorded music. In one common form the disks are five and a quarter inch diameter flat disks having a central axis for being engaged and spun by a drive motor. The disk encloses a material of known reflective properties encased in a hard, transparent protective shell. In erasable magneto-optic disks the reflective material is also a magnetic material which can support local magnetic domains or regions. The reflection characteristics of the surface of the disk depend upon the local magnetic domain state. Detection of the changes in reflectivity is enhanced by polarizing the incident radiation hitting the surface of the optical disk. While the changes in reflection characteristics are subtle, the orientation of the magnetic dipole in each local region can be detected by measuring selected phase characteristics of the polarized light reflected by the region. Thus each local region can represent one piece of binary data with the orientation of the magnetic dipole being associated with the data value.

The magnetic field of the material is reversible and thus erasure and repeated rewriting on the disk is possible. When the reflective material is below its curie temperature, the magnetic domains are substantially locked. When the material is above its curie temperature, an outside magnetic field can be used to set the magnetization of the material, which is substantially locked upon cooling of the material. Where the curie temperature is exceeded only in a local region, the magnetic polarization of just that local region can be changed.

The temperature of a local region is controlled by heating the selected local region with a laser beam. Domain orientation is set by applying a magnetic field to the region. The area cools while the field is present, thus setting the magnetic polarization of the local region. A focusing or objective lens is used to focus the laser beam at the surface of the disk. The tighter the focus of the laser beam used to heat the region, the smaller this region will be, reducing the power requirements to heat the material. Regions can then be allowed closer to one another increasing data density.

The same laser source is used for a read operation, a write operation and an erase operation. Distinct power levels exist for each of these operations.

The local regions in which data are stored are typically arranged serially in sectors in a plurality of concentric tracks or a spiral track on the face of a disk. Groups of local regions are identified by track and sector designation relating to a coordinate system for locating and relocating the local regions. The tracks are externally manifested by grooves in the surface of the disk.

The grooves are optically detectable allowing a read/write head to be oriented over the center of the groove while the disk spins underneath the head. The read/write head carries a laser source, the objective lens for focusing the laser beam and an optical detector for developing positioning signals for the objective lens. One of the positioning signals is generated by a tracking servo loop, which operates to center the read/write head, and thereby the objective lens, over the groove. Another positioning signal is generated by a focus signal servo loop and brings a focal point of the objective lens to the surface of the erasable disk.

Some optical disk recorders employ constant lineal speed control, i.e., as the laser beam scans radially more outward tracks, the rotational speed of the disk is reduced to maintain a constant lineal track scanning speed. Such recorders are often employed for audio and video recording. On the other hand, data recording devices, such as those used with computers and the like, employ a constant rotational speed. It is to be appreciated that at a constant rotational speed a signal of a given duration is recorded as a longer mark in a radially-outward track on the disk than when recorded on one of the radially-innermore tracks. In pulse-position-modulation (PPM) recording, the change in recorded mark lengths create different recording tolerances at different radii of the disk. Different recording formats also result in different recording tolerances. Since the scanning time for the different length marks is relatively constant, slight variations in speed and responsiveness of the recording media, particularly magnetooptic media, can be tolerated.

When an encoding method known as pulse-width modulation (PWM) is employed, then the tolerances required for successful read-back of the recorded information are reduced. PWM provides for higher linear recording densities than PPM. In pulse-width modulation the duration of a pulse recorded on a record track is varied for indicating different informational values. For example, a relatively short duration pulse would represent binary zero, a slightly longer pulse represents a binary one, a yet longer pulse representing a two, and so forth. A single recorded pulse can represent a number up to modulo 10 or 16. Pulse-width modulation greatly enhances the data storing capability of a record media. It is to be appreciated that this greater storage capability comes at a severe price in that distinguishing between various pulse lengths is usually a difficult read-back operation, particularly for interchangeable media. That is, one recorder may record pulses which tend to be long while another recorder records pulses which tend to be short. Somewhere in between the short and long pulses a region of ambiguity exists as to the informational content of a given pulse which may not be reliably and readily determined even by sophisticated and complex read-back circuits. Accordingly, it is desired to provide a uniformity in recording for facilitating pulse-width modulation of information-bearing signals onto optical media such that not only is signal read-back improved and facilitated, but that interchange of media among a plurality of recorders is made more reliable.

Optical recording has used constant intensity laser beams for creating recorded pulses on optical media. It is also well known that pulsed or "serrated" writing signals can also be applied. That is, a series of short duration pulses effectively record a single long pulse on the record medium. Thermal diffusion of the heat induced into the recording layer by the recording laser beam also causes distortion of the recorded pulse in optical recording. It is desired to minimize the negative effects of such thermal diffusions by carefully calibrating the laser write pulses to provide a uniformity of recording among a plurality of optical disk recorders.

SUMMARY OF THE INVENTION

It is an object of the present invention to provide improved storage of information recorded on moving media data storage systems.

It is another object of the invention to provide a method of calibrating write power applied to a marking transducer used to record information as marks on the moving media to improve later recovery of the information represented by the marks.

It is yet another object of the invention to provide a method of calibrating write power applied to a laser used in marking a magnetooptic media in a disk drive to maximize peak to peak amplitude generated in reading back the marks at a predetermined read-back power setting of the laser.

Calibration of the write signal power level applied to a transducer for marking a moving media to optimize a later recovered read-back signal is provided. An optimized read-back signal is one where the peak-to-peak amplitude of the read-back signal is maximized. The method provides marking test patterns on the recording media at a plurality of discrete, selected write signal power levels of the marking source, developing a read-back signal from the test pattern marks, correlating portions of the read-back signal with the write signal power levels and solving a relationship of the form $$W_c = W_o - KB_2/2B_3$$

where $W_c$ is the calibrated write signal power level. $W_o$ is an offset write signal power level. K is the step between a plurality of test write signal power levels. $B_2$ and $B_3$ are parameters derived from a least squares fit of a second order polynomial equation to data provided by correlating read-back signals with write signal power levels.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a simplified showing of a calibration track used in the practical embodiment of the invention.

DETAILED DESCRIPTION OF THE INVENTION

Figure 1:
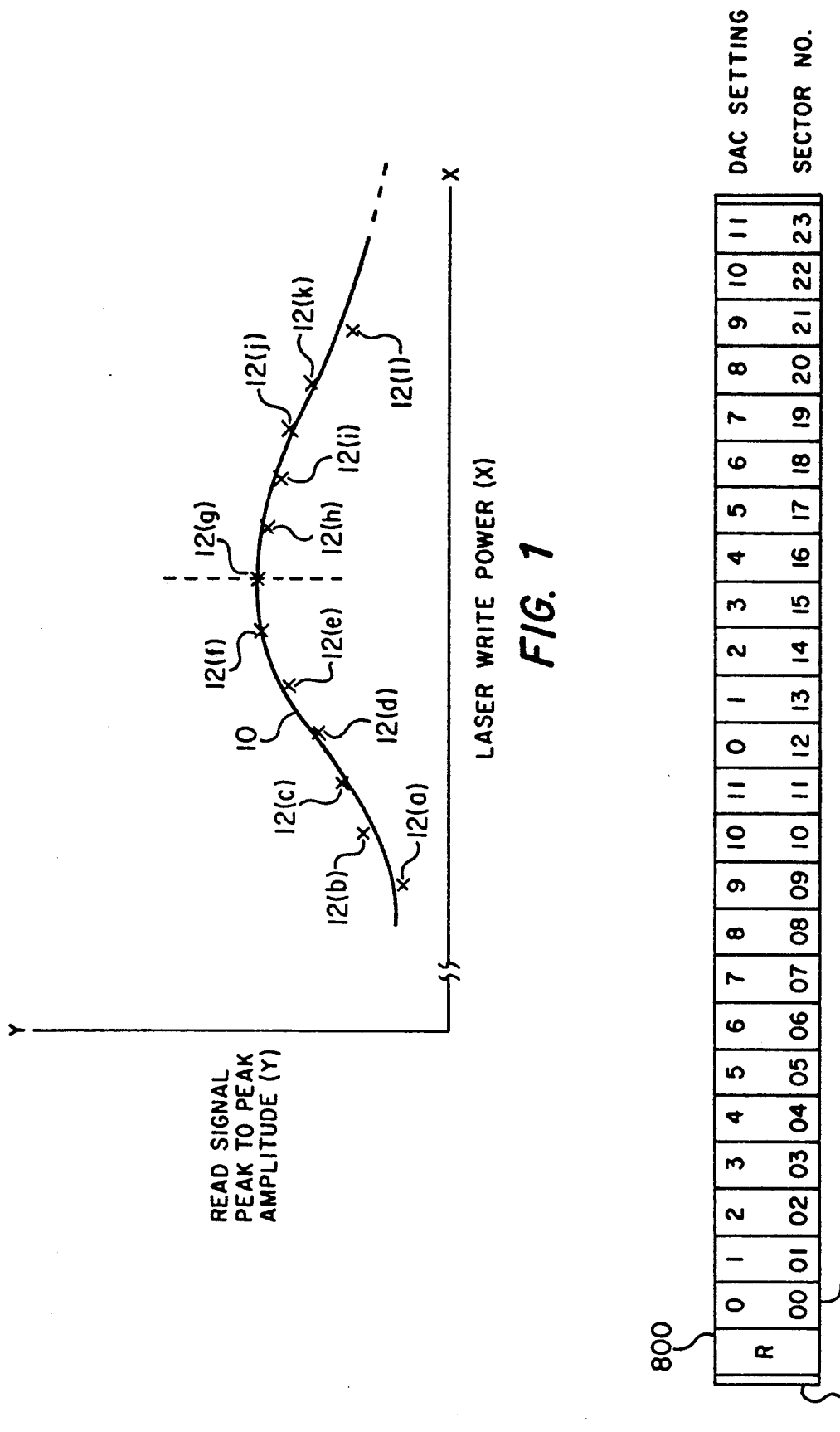
FIG. 1 is a graphical illustration of a set of hypothetical data points relating write power applied to a laser in a magnetooptic disk drive, subsequent peak to peak amplitude of a read-back signal and a curve defined by a polynomial equation fitted to the data points using a least squares fit.

Referring now more particularly to the Figures, like numbers indicate like parts and structural features in the various figures. Referring firstly to FIG. 1, curve 10 represents an idealized relationship of read-back signal amplitude with respect to laser write power. The laser write power increases from the left along the horizontal ordinant, and peak to peak amplitude of a read-back signal increases upwardly along the vertical ordinant. Data signals should be recorded at a write signal power level where the read-back signal amplitude as indicated by curve 10 reaches a maximum as indicated by vertical line 11. Using the laser power represented by the maximum signal amplitude provides an optimum recording laser power level for ensuring precise and faithful digital recording on record media.

The quality of the read-back signal is a strong function of the marks recorded on an optical record medium, particularly on magnetooptic (MO) record media. When the recorded marks are too small, the effective light reflected from the record medium results in a reduced read-back signal amplitude. When the marks are too large, inter-symbol interference reduces the effective read-back amplitude and also results in undesired peak shifting of the read-back signal, which can cause signal detection errors. It is desired to produce recording marks which result in a maximal read-back signal amplitude and minimum peak shift. At either extremes of too small a mark or too large a mark, the signal to noise ration (SNR) reduces while jitter and peak shift increases, which reduces the probability of detecting the marks within a detection window as is known. Further, the mark size is also a strong function of the signal storage media sensitivity, the ambient temperature in which the media resides, the recording pulse durations, spot size, laser power, relative linear velocity of the media as it passes by the recording laser beam and the amplitude of a magnetic bias or steering field used in magnetooptic recording.

Curve 10 represents a least squares fit of a polynomial expression.

$$y = B_1 + B_2 x + B_3 x^2 \tag{1}$$

to data points 12(a)–12(i). Data points 12(a)–12(i) are hypothetical graphs of laser write signal power level settings (x) versus subsequent read-back signal amplitudes (y).

Figure 2:
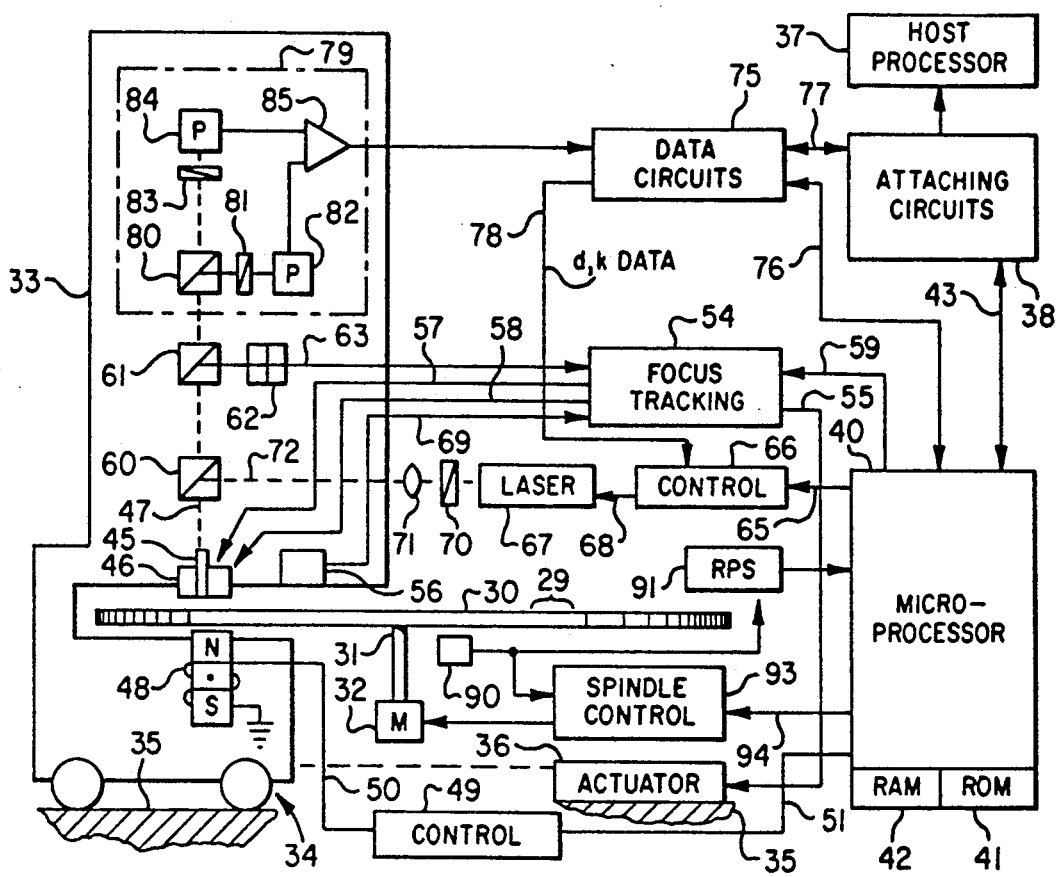
FIG. 2 is a partial block diagram part schematic representation of a magnetooptic disk drive to which the methods of the present invention may be advantageously applied.

20 An optical recorder with which the present invention may be advantageously employed is shown in FIG. 2. A magnetooptic record disk 30 is mounted for rotation. On spindle 31 by motor 32. Optical head-carrying arm 33 on head-arm carriage generally denoted by numeral 34 moves radially of disk 30. A frame 35 of a recorder suitably mounts carriage 34 for reciprocating radial motions. The radial motions of carriage 34 enable access to any one of a plurality of concentric tracks or circumvolutions of a spiral track for recording and recovering data on and from disk 30. Linear actuator 36 suitably mounted on frame 35, radially moves carriage 34 for enabling track accessing. The recorder is suitably attached to one or more host processors 37. Such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processors 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42. Microprocessor 40 controls the laser calibration, as will become apparent.

The optics of the recorder include an object or focussing lens 45 mounted for focussing and tracking motions on head arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, electromagnet 48 in a constructed embodiment provides a weak magnetic steering or bias field for directing the remnant magnetization direction of a small spot on disk 30 illuminated by laser light from lens 46. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones are recorded on disk 30 normally are "north pole remnant magnetization". To erase disk 30, magnet 48 reverses its magnetic field such that the south pole is adjacent disk 30. Magnet control 49 which is electrically coupled by line 50 to electromagnet 48 controls the write and erase directions of the electromagnet 48 produced magnetic steering field. Microprocessor 40 supplies control signals over line 51 to control 49 for effecting reversal of the recording direction.

It is necessary to control the radial position of the beam following path 47 such that a track or circumvolution is faithfully followed and that a desired track of circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the actuator control by circuits 54 is exercised by control signals traveling over lines 57 and 58 respectively for focus and fine tracking and switching actions of fine actuator 46. Sensor 56 senses the relative position of fine actuator 46 to head arm carriage 33 and supplies a relative position signal over line 69.

The focus and tracking position sensing is achieved by analyzing laser light reflected from disk 30 over path 47, thence through lens 45, through half mirror 60 and reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is supplying a steering field for recording data. Microprocessor 40 supplies a control signal over line 65 to laser control 66 for indicating that a recording operation is to ensue. This means that laser 67 is energized by control 66 to emit a high intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67. Data circuits 75 supply data or write pulses over line 78 to control 66 for modulating the operation of semiconductor laser 67 in a known manner. The laser 67 modulated light beam passes through polarizer 70 (linearly polarizing the beam), thence through collimating lens 70 toward half mirror 60 for being reflected toward disk 30 through lens 45. Data circuits 75 are prepared for recording and the microprocessor 40 supplies suitable control signals over line 76. Microprocessor 40 includes control circuits for effecting and controlling machine operations that occur too fast for being effected and controlled by microcode execution. Microprocessor 40 in preparing circuits 75 is responding to commands for recording received from a host processor 37 via attaching circuits 38. Once data circuits 75 are prepared, data is transferred directly between host processor 37, data circuits 75 through attaching circuits 38. Data circuits 75 also include ancillary circuits (not shown) relating to disk 30 format signals, error detection and correction and the like. Circuits 75, during a read or recovery action, strip the ancillary signals from the read-back signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams, both having the same reflected rotated linear polarization. From half-mirror 80 reflected light travels through a first polarizer 81 which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to rotational position sensing (RPS) circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 3:
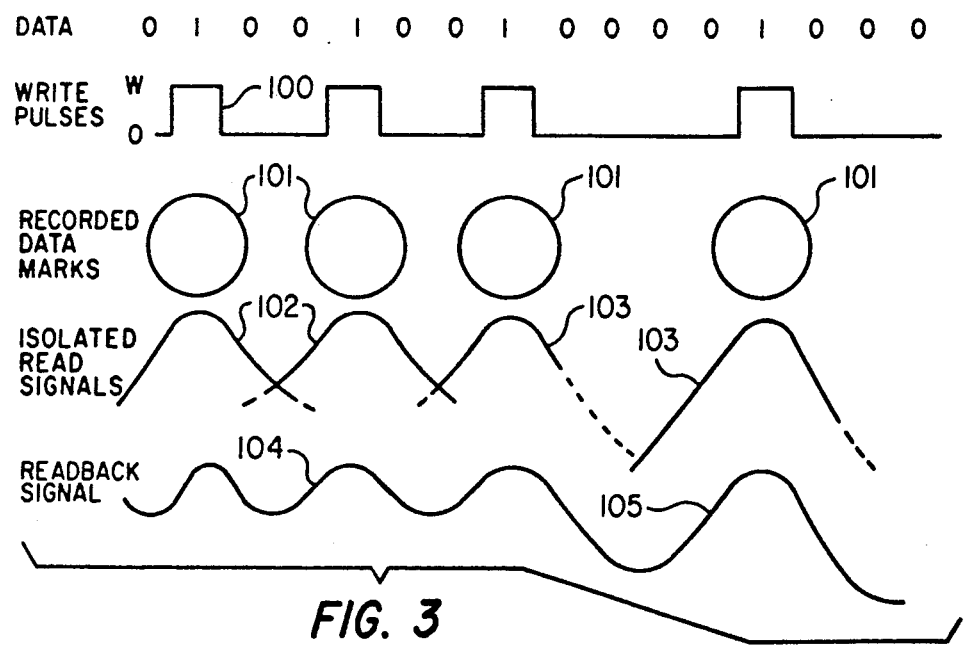
FIG. 3 is a set of idealized optical recording patterns along with representative data for indicating parameters related to the practice of the invention.

Referring now more particularly to FIG. 3, the relationship between pulse-position modulation (PPM) data and the actual signal recorded on a magnetooptic medium illustrates some parameters of the operation of the present invention. The illustrated data shows two cycles of pattern 1001 (highest density pattern) and two cycles of pattern 100001 which can be represented as a minimum wavelength and a nominal wavelength of an encoded 2, 7 D, K code. The resultant write pulses 100 show the different one-half wavelengths of the recording signal. On the record medium spots 101 are recorded for each of the write pulses respectively. It is to be appreciated that the spots 101 are made circular and are idealized to that extent. When the spots are relatively close together, i.e. at the highest frequency of the data to be recorded, then the read-back signal 102 from each of the spots 101 interact to cause a read-back signal portion 104 having reduced signal peak amplitudes. However, when the spots 101 are spaced further apart, i.e. at the lower frequency data repetition rates, the isolated read signals 103 are spaced further apart with resultant less intersymbol interference (each mark 101 is considered a symbol). As a result of less intersymbol interference, the read-back signal portion 105 has increased in peak to peak signal amplitude. The intersymbol interference of the closely spaced marks 101 can also result in substantial peak shift of the peaks in the portion 104. The size of the recorded data marks 101 is effected by all of the parameters stated above with respect to FIG. 1. An easy way to control the size of the marks 101 but optimize the size for the highest frequency of operation is through adjustment of laser power.

Figure 4:
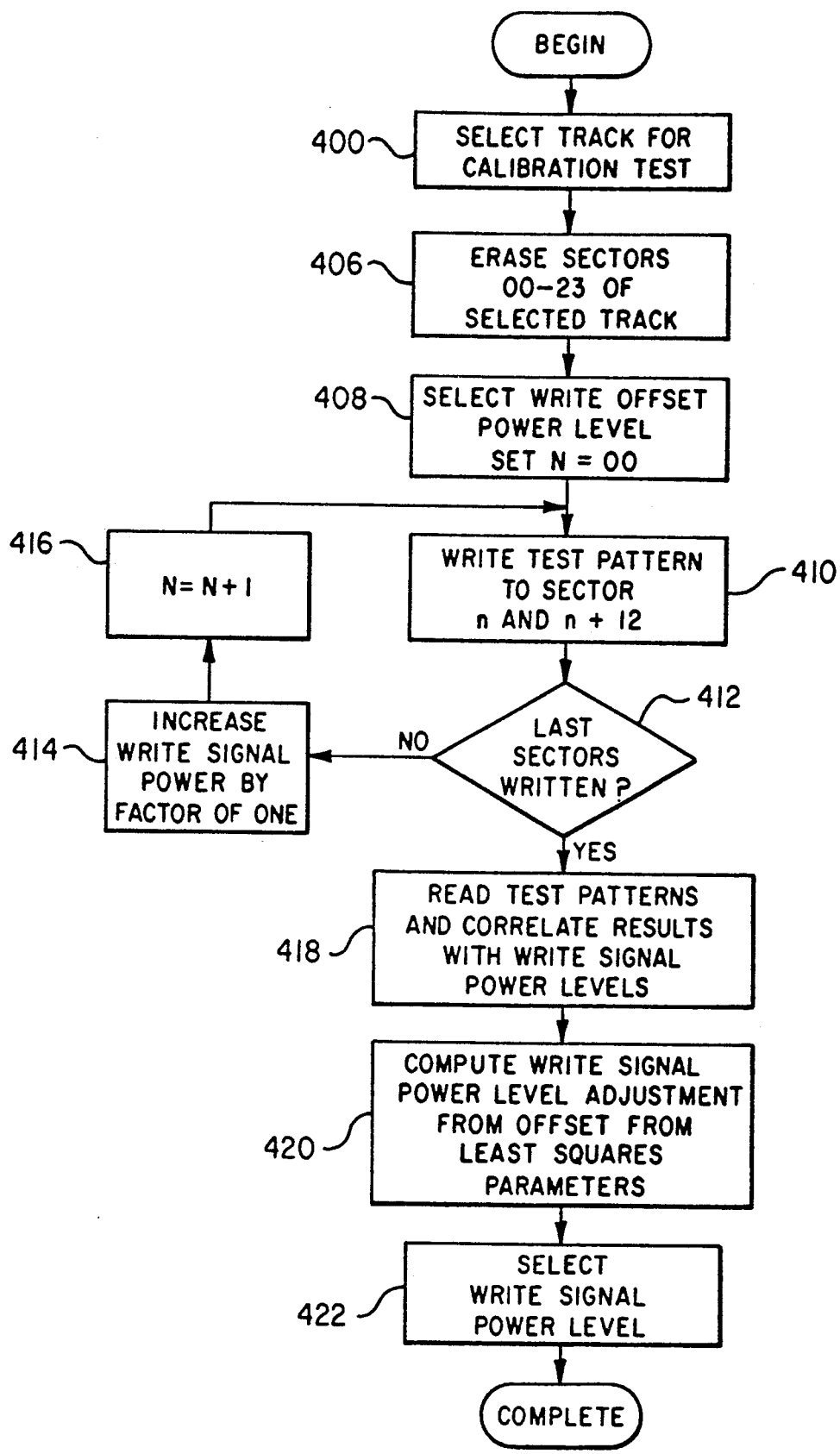
FIG. 4 is a simplified flowchart showing the calibration sequence used to practice the invention.

FIG. 4 illustrates a logical flowchart relating to operation of microprocessor 40 under control of programming stored in ROM 41. Those skilled in the art will appreciate that the flowchart represents a simplification of the operation of microprocessor 40, disregarding such operations as focusing of lens 45, tracking operations, data interchange with host 37 and the like. Initially a track on a magnetooptic media, revolving disk 30 is selected. The selection of a track for calibrating laser power can have a significant effect on the quality of recording. Magnetooptic media is subject to sensitivity shift with time (SST) which can cause variations in recording at the same recording laser power level. The SST for a given record medium is dependent upon the composition of the magnetooptic layer as well as other manufacturing techniques used in making a record medium. On some magnetooptic media the SST results in a reduced sensitivity to laser recording; i.e., a smaller mark is generated for the same level after an SST has occurred for the MO medium. In other compositions the SST is toward increased sensitivity wherein a larger mark occurs in those areas being subject to SST, therefore it is desired to calibrate the laser on those tracks not subject to SST. SST usually shows up in those areas of a record medium which are repeatedly accessed for recording an erasure; i.e., subject to update in place such as the directory areas of a record medium. On some MO media, SST occurs after 10,000 magnetization reversals, i.e. recording and erasures. The rate of SST will also vary. The SST can occur in only one sector of a track because that sector is repeatedly erased and rewritten. Which sectors are repeatedly erased and rewritten usually is not logged, therefore it is unknown without performing time consuming tests on such sectors. One way to avoid SST is to assign a predetermined number of calibration tracks. Then within the group of tracks, a track is randomly selected for reducing the effects of repeated calibrations causing SST. Random selection of a track at machine step 400 reduces such SST as a result substantially uniform utilization of the available calibration tracks. The number of erasures and rewriting as performed is recorded as reference R in one of the sectors of the track 800 as seen in FIG. 8.

A high power erase of the calibration track occurs at machine step 406. A high power erase refers to an erasure in which there remains insubstantial residual recording; that is when a data track is erased, the erasure power is less than the writing or recording laser power level. As a result, some residual remnant magnetizations may reside even after erasure, which is not a problem during normal recording, however, it could have an effect on the power calibration and therefore the erasure power is at least at the level of recording.

All write signal power levels for laser 67 are initially expressed as integer values, which are subject to digital to analog conversion before application to laser 67. At machine step 408 an initial or offset write signal power level, $W_{OFF}$, is selected. Where the range of write signal, power level available range from 5 milliwatts to 12 milliwatts, the lower value may be selected as the initial offset value. In addition, the step between power levels, K, may be determined.

At machine step 410, a test pattern is written at the first or offset write signal power level to sectors 00 and 12 of a track. At machine step 412 it is determined if all sectors of the track (in a preferred drive, 24 sectors are available per track, numbered 00 through 23) have been marked. At machine step 414 the write signal power level is incremented one step (i.e., by a factor of K) and the count N is incremented by one. Machine steps 410, 412, 414 and 416 are repeated until all of sectors 00 through 23 are written with the test pattern. Of 24 available sectors, 2 each will be written at each write signal power level for a total of 12 write signal power level settings.

At machine step 418 the calibration track is illuminated at a predetermined, fixed read power level by laser 67 for reading the marks. Read-back signals for each sector are correlated with write signal power levels for purposes of performing a least squares fit of the data on a second order/polynomical equation.

At machine step 420 a write signal power level adjustment from the offset write signal power level is computed to determine a calibrated write signal power level. Preferably readings for a given power level $y_i$ (read-back signal amplitude) are summed or averaged as a preliminary step. To reduce computational load, and to increase accuracy, a subset of data points bracketing the data point exhibiting the maximum peak to peak amplitude read-back signal may be chosen. Preferably four sectors to each side of the maximum are used for a total 9 data points.

The maximum amplitude read-back signal predicted by polynomial equation (1) occurs where the derivative of equation 1 equals zero.

Taking the derivative, $$dy/dx = B_2 + 2B_3 x \tag{2}$$

Setting the derivative equal to 0, $$0 = B_2 + 2B_3 x \tag{3}$$

and solving for x.

$$x = -B_2/2B_3 \tag{4}$$

The parameters $B_2$ and $B_3$ of equations (4) can be evaluated from an over determined system of data. From equation (1), the matrix representation for a system of N measurements is:

$$\begin{bmatrix} y_1 \\ y_2 \\ \cdot \\ \cdot \\ \cdot \\ y_n \end{bmatrix} = \begin{bmatrix} 1 & x_1 & x_1^2 \\ 1 & x_2 & x_2^2 \\ \cdot & \cdot & \cdot \\ \cdot & \cdot & \cdot \\ \cdot & \cdot & \cdot \\ 1 & x_n & x_n^2 \end{bmatrix} \begin{bmatrix} B_1 \\ B_2 \\ B_3 \end{bmatrix} \tag{5a}$$

or $$Y = AB \tag{5b}$$

The least square fit of (5b) is:

$$\overline{B} = (A^T A)^{-1} A^T A \tag{6}$$

Thus, substituting:

$$B = 1/\det(A^T A) \cdot \begin{bmatrix} c_{11} & c_{21} & c_{31} \\ c_{12} & c_{22} & c_{32} \\ c_{13} & c_{23} & c_{33} \end{bmatrix} \cdot \begin{bmatrix} \Sigma y_i \\ \Sigma x_i y_i \\ \Sigma x_i^2 y_i \end{bmatrix} \tag{7}$$

where
$c_{11} = \Sigma x_i^2 \, \Sigma x_i^4 - (\Sigma x_i^3)^2$
$c_{21} = c_{12} = \Sigma x_i^2 \, \Sigma x_i^3 - \Sigma x_i \Sigma x_i^4$
$c_{22} = n \, \Sigma x_i^4 - (\Sigma x_i^2)^2$
$c_{31} = c^{13} = \Sigma x_i \Sigma x_i^3 - (\Sigma x_i^2)^2$
$c_{32} = c_{23} = \Sigma x_i \, \Sigma x_i^2 - n \Sigma x_i^3$
$c_{33} = n \Sigma x_i^2 - (\Sigma x_i)^2$ Where the set of allowed values for $X_i \in \{0, 1, 2, 3, 4, 5, 6, 7, 8, 9, 10, 11\}$ and $N=11$ (i.e. we have 12 write current levels): then:

$C_{11} = 1{,}252{,}108 \quad\quad C_{22} = 223{,}652$ $C_{12} = C_{21} = -434{,}148 \quad C_{13} = C_{31} = 31{,}460$ $C_{23} = C_{32} = -18{,}876 \quad C_{33} = 1{,}716$ Calculating the numbers in advance expedites processing.

It can be derived that $$X = -B_2/2B_1 = \frac{(c_{12}\Sigma y_i + c_{22}\Sigma x_i y_i + c_{32}\Sigma x_i^2 y_i)}{2(c_{13}\Sigma y_i + c_{23}\Sigma x_i y_i + c_{33}\Sigma x_i^2 y_i)} \tag{8}$$

and thus where power levels are discrete and the step between levels is taken an equalling 1. Thus the following values require determination for finding $W_c$, the optimal write signal power level.

$$\begin{array}{ll} n & \Sigma x_i^4 \\ \Sigma x_i & \Sigma y_i \\ \Sigma x_i^2 & \Sigma x_i y_i \\ \Sigma x_i^3 & \Sigma x_i^2 y_i \end{array}$$

However, for a given n and thus a predetermined range of values $x_i$ for $i=0$ to $n-1$, all terms except those including $y_i$ may be determined and stored in memory prior to reading of the test patterns. This reduces computational loading of microprocessor 40. However, all values for $x_i$ are represented as a sequence of integers, accordingly if 0 is chosen to represent the offset power level and K, the step between power levels, equals 1, then:

$$x_i = i \text{ for } i=0 \text{ to } n-1 \qquad (9)$$

thus $c_{11}$, $c_{12}$, $c_{13}$, $c_{21}$, $c_{22}$, $c_{23}$, $c_{31}$, $c_{32}$ and $c_{33}$ are readily soluble for integer solutions if the number of samples is known in advance.

Thus the optimum write signal power level can be found from:

$$W_c = W_o + kx \qquad (10)$$

by substituting $-B_2/2B_3$ for X we get $$W_c = W_o - KB_2/2B_3 \qquad (11)$$

At machine step 422 the write signal power level is established. The selected write power is a digital to analog converter (DAC) setting that gives a maximal read-back signal amplitude, i.e. a higher quality signal. To ensure highest quality, the calibration operation can be repeated by selecting another track at the radial midpoint of the recording area and then at the outer diameter of the recording area. Then the recording area can be zoned and differing laser power levels can be determined for the inner diameter, middle diameter and outer diameter of the recording zone. The laser power can be adjusted linearly by using interpolation techniques for all of the tracks intermediate, the inner diameter, middle diameter and outer diameter calibration tracks. In many instances, calibrating on one track is sufficient.

Figure 5:
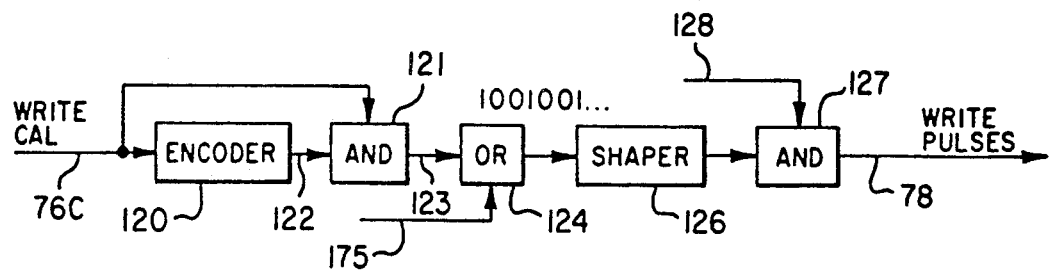
FIG. 5 is a simplified block diagram of a test pattern generator usable for practicing the invention.

FIG. 5 shows the generation of the write pattern. The calibration is initiated by microprocessor 40 causing the focus and tracking circuit 54 to move the beam of radiation to one of the calibration tracks in calibration track set 29. Subsequent to machine step 406, microprocessor 40 defines an activating signal over line 76c which is one of the lines in cable 76 in FIG. 2 to activate encoder 120. Encoder 120 when activated repeatedly supplies data pattern 100 over line 122 to AND circuit 121 which is enabled by the activating signal on line 76c. AND circuit 121 passes the repeated generated test pattern 100 over line 123 through OR circuit 124 to pulse shaper 126. Shaper 126 converts the data into write pulses 100, as shown in FIG. 3. AND circuit 127 is enabled by a write enable signal On line 128, received from microprocessor 40, to pass the write pulses to line 78 which then travel to the laser control 66 (FIG. 2) while recording the repeated test pattern. It should be noted that the signal at line 128 enables AND circuit 127 only during the recording area of the respective sectors of a calibration track; that is, each track on disk 30 is divided into sectors which are on radially extending lines equally, angularly spaced apart through the circumference of disk 30. For example, each track is divided into 25 sectors. The sectors are separated in a hard sector disk using embossed indicia which indicate the sector number, track number, and the onset of data recording area. Microprocessor 40 indicates to RPS circuit the location of the sector identifications, as well as the recording areas as is known in the disk art. Microprocessor 40 responds to RPS circuit 91 in a known manner for generating a record signal over line 128, which is also a portion of line 76 to data circuit 75. Therefore, the line 78 carried write pulses are timed through angular or rotational position sensing in the usual manner.

Figure 6:
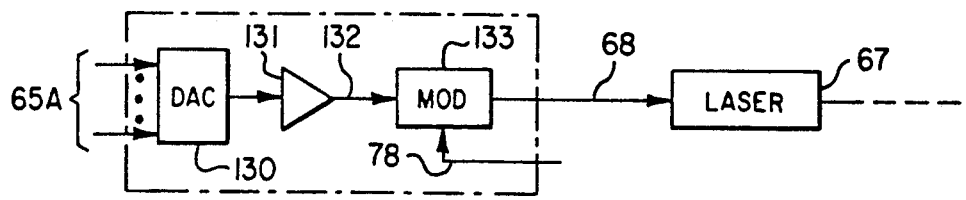
FIG. 6 is a simplified block diagram of a laser control system.

FIG. 6 is a part of control 66 for energizing the laser 67. The recording pulse level is determined by microprocessor 40 by sending a number over cable 65a, a portion of line 65 of FIG. 2, which indicates the desired laser recording power level. Digital to analog converter DAC 130 converts the number on cable 65a into an analog value. Amplifier 131 amplifies the analog value to a predetermined level on line 132. Modulator MOD 133 receives the write pulses over line 78 from the FIG. 5 illustrated circuits. When the write pulses 100 are at a zero level, then modulator 133 is activated to divert the signals on line through a current source switch from laser 67. During such diversion, modulator 133 supplies a minimum laser power activating signal over line 68 to laser 67 which is insufficient to cause a reversal of magnetization in disk 30 as explained with respect to FIG. 2. Whenever write pulses 100 are at level W, then modulator 133 is activated by the write pulses. To remove the current diversion and direct the current from amplifier 131 to laser 67 over line 68. This additional current drive to laser 67 causes it to immediately emit a higher power laser beam for heating the disk 30 in the impinging area of the laser beam above the Curie point for reversing the magnetization of the disk 30 at that spot as described with respect to FIG. 2. In usual data recording, the data to be recorded is supplied over line 125 by data circuit 75 in synchronism with the RPS circuits 91 indicating rotational position, all as known. The sequence of writing the patterns and the actual patterns resulting is later described with respect to FIG. 8.

Figure 7:
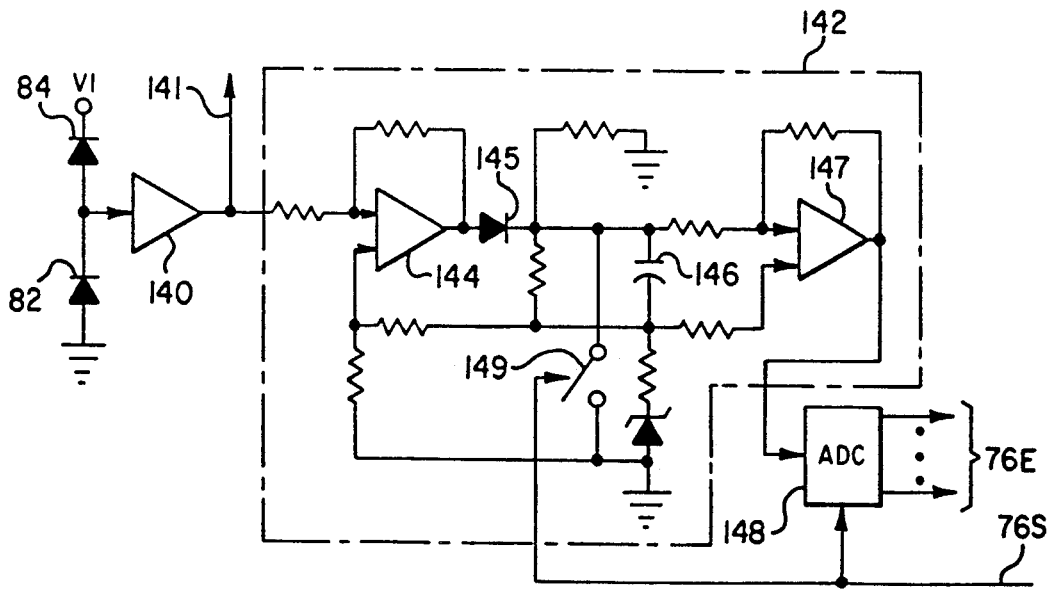
FIG. 7 is a simplified circuit diagram used to envelope detect the read-back signal amplitudes when calibrating laser source power.

FIG. 7 illustrates the detection of the recorded test patterns and the resultant generation of indicated readback signal amplitude. FIG. 7 illustrates the operation, in part, of machine step 418 (FIG. 4). The reflected light from disk 30 is split into two beams which respectively impinge upon photodiodes 82 and 84, as best seen in FIG. 2, rather than the separate connections to differential amplifier 85. As shown in FIG. 7, diodes 82 and 84 are connected in cascade fashion with the center connection being an input to operational amplifier 140. Operational amplifier 140 outputs read-back signal 104, 105 over line 141 to the usual data detection circuits which are located within data circuit 75. Additionally, envelope detector 142 receives read-back signal 104, 105 for generating an average signal amplitude as will become apparent. Envelope detector 142 includes amplifier 144, which supplies the read-back signal through rectifier 145 to integrator capacitor 146. Integrator capacitor 146 in turn supplies the integrated or averaged value through amplifier 147 to analog to digital converter 148. Analog to digital converter 148 generates a numerical value for the amplitude which is supplied over cable 76e to microprocessor 40.

When a sector is terminated, microprocessor 40 supplies a signal over line 76s for resetting ADC 148 and squelching integrator 146 as represented by switch 149, all in preparation for reading the next sector containing the test pattern. Microprocessor 40 samples the signals on cable 76e just before sending signals 76s. The operation just described is repeated for each sector of the calibration track or tracks such that microprocessor 40 creates a table of sensed read-back signal amplitudes based upon signal envelope integration. Upon completion of the sensing step 418, microprocessor 40 will have a complete table of all measured values for correlation with their DAC settings and application of fitting algorithm.

The algorithm for recording the diverse laser power level test patterns in machine steps 410–416 is described with respect to its effect by the illustrated track 800 of FIG. 8. It is to be understood that the sectors within track 800 all have the same circumferential length. Sector 802, which is located immediately adjacent to the usual index mark of an optical disk, contains the number of times R a calibration has occurred on the track for indicating exposure to SST. Erasure step 406 erases all of the sectors except sector 802. The laser power is determined by microprocessor 40 activating DAC 130. The value supplied over cable 65a to DAC is incremented at each of the first 12 sectors represented in FIG. 8 by the vertical lines between the indicated sectors as between sectors 802 and 804. The first recorded test pattern sequence is at an offset write signal power level for recording indicated by the DAC setting 0. Each subsequently recorded sector in the track has an increased laser power level of a predetermined step size through sector 11. The power settings are repeated for a second set of sectors. As mentioned above, each magnetooptic medium may have different sensitivities based upon differing compositions and the like and other factors. Sensitivity may also vary with ambient temperature in which the disk resides. Generally, an empirical determination will find a minimum and maximum laser power level for use in laser power calibration for writing and a step size for covering the range.

The method disclosed here has several advantages over the prior art. First, despite the relative flatness of read-back amplitude versus laser write power at points adjacent the maximum, the present method readily resolves the optimum point. In addition, information from each of several data points contributes to the solution. The solution is not taken as an isolated point which, after comparison to other points, appears to be the point of maximum read-back signal amplitude. Thus the method is not sensitive to variability of a single measurement point, which may result from a number of nonrepeatable factors. The method allows interpolation between DAC values without requiring actual measurement points. If the optimum write signal power level is outside the range of powers used, the method will predict where the optimum value is. In application, the DAC step sizes should be set to be sufficient to cover the range of possible optimum write signal levels. Because of ready application of the method to interpolation between values, small DAC step values are not required.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method of calibrating a write signal power level applied to a marking source for a recording media, wherein the calibrated write signal power level substantially maximizes peak to peak amplitude of a read-back signal generated from marks formed by the marking source on the recording media, the method comprising the steps of:

applying a plurality of write signal power levels to the marking source in marking the recording media with a test pattern;

generating a read-back signal from the test pattern;

measuring the amplitude of the read-back signals;

correlating measurements of the amplitude of the read-back signal with the plurality of write signal power levels; and determining the calibrated write signal power level, the determining step including, solving a relationship of the form $$W_c = W_o - KB_2/2B_3$$

where $W_c$ = calibrated write signal power level
$W_o$ = offset write signal power level
K = step interval between adjacent write signal power levels
$B_2$ and $B_3$ are parameters from at least squares fit of a second order polynomial equation to data provided from the correlating step; and selecting the calibrated write signal power level as the recording write signal power level.

2. A method as set forth in claim 1, wherein the recording media is a disk set for rotation in a disk drive unit, and the disk drive unit includes a microprocessor controller and a digital to analog converter for generating write signal power level, the method further comprising:

applying digital to analog converter (DAC) settings from the microprocessor controller to the digital to analog converters, wherein the DAC settings are a sequence with uniform intervals between adjacent settings and each DAC setting corresponds to one write signal power level.

3. A method as set forth in claim 2, wherein the step of applying a plurality of write signal power levels includes:

determining a sequence of uniformly spaced DAC settings; and applying, in response to microprocessor controller selection, the sequence to the digital to analog converter.

4. A method as set forth in claim 3, wherein the disk includes a plurality of tracks, and each track is radially divided into a plurality of sectors, the method further comprising the steps of:

selecting one of the plurality of tracks as a calibration track;

marking sectors of the calibration track with the test pattern, individual sectors being marked at a particular write signal power level; and writing at each write signal power level at least twice, at two mutually spaced sectors of the calibration track.

5. A method as set forth in claim 4, wherein the step of correlating measurements further includes:
combining measurements associated with particular write signal power levels.

6. A method as set forth in claim 5, and further comprising the steps of:
identifying a write power signal level correlated with the measurement of the read-back signal exhibiting the greatest amplitude; and
determining the calibrated write signal power level by solving the parameter $B_2$ and $B_3$ using a selected subgroup of DAC settings adjacent and including the DAC settings providing the identified write signal power level.

7. A method as set forth in claim 6, wherein the disk drive unit is a magnetooptic drive unit and the marking source includes a laser to which the write signal power levels are applied.

8. A moving media memory for providing a maximum amplitude read-back signal, the moving media memory comprising:
a moving recording media;
means for marking the moving recording media;
means for generating a read-back signal from the marks on the moving recording media;
means for measuring the amplitude of the read-back signal; and
means for selecting write signal power levels for application to the marking means, for correlating measurements of the amplitude of the read-back signal with the selected write signal power levels, and for determining an optimized write signal power level wherein the optimized write signal power level, $W_c$, is determined by the solution of the relationship $$W_c = W_o - KB_2/2B_3$$

where $W_o$ is an offset write signal power level, K is a step interval between adjacent write signal power levels, and $B_2$ and $B_3$ are parameters satisfying a least squares fit of a second order polynomial equation to data provided by correlated amplitude measurements and the selected write signal power levels.

9. A moving media memory as set forth in claim 8, wherein the moving media memory is a disk drive memory unit, the moving recording media is a disk set for rotation in the disk drive memory unit, and the selecting, correlating and determining means is a programmed microprocessor.

10. A disk drive memory unit as set forth in claim 9, and further comprising:
digital to analog converter means responsive to the programmed microprocessor for applying write signal power levels to the marking means, wherein selection of write signal power levels is provided by selection of digital to analog converter settings applied to the digital to analog converter means.

11. A disk drive memory unit as set forth in claim 10, wherein the digital to analog converter settings include a sequence of uniformly spaced integers.

12. A disk drive memory unit as set forth in claim 11, and further comprising:
a plurality of tracks on the disk;
a plurality of radially divided sectors within each track;
means for selecting one of the tracks as a calibration track;
wherein a test pattern is marked in each of a plurality of sectors of the calibration track at a selected write signal power level; and
wherein each write signal power level is used at least twice with respect to at least two spaced sectors of the calibration track.

13. A disk drive memory unit as set forth in claim 12, further comprising means for combining measurements of read-back signal amplitude at each selected write signal power level.

14. A disk drive memory unit as set forth in claim 13, and further comprising:
means for identifying a measurement of the read-back signal, and its correlated write signal power level, exhibiting the greatest amplitude; and
means for determining the calibrated write signal power level $W_c$ by solving for the parameters $B_2$ and $B_3$ using a selected subgroup of digital to analog converter settings and correlated amplitude measurements to and including the digital to analog converter setting for the identical measurement.

15. A disk drive unit as set forth in claim 14, wherein the disk drive memory unit is a magnetooptic disk drive unit and the marking means include a laser.

16. A data processing program product for maximizing the amplitude of a read-back signal in a drive memory unit, the drive memory unit including a moving media, a microprocessor, digital to analog means for converting digital to analog converter settings to write signals of various power levels, means responsive to the write signals for marking the moving media, means for generating a read-back signal from the marking of the moving media, and means for measuring the amplitude of the read-back signal, the data processing program product comprising a media storing:
instruction means for selecting digital to analog converter settings;
instruction means for correlating measurements of the amplitude of the read-back signal with the selected digital to analog converter settings; and
instruction means for determining an optimized power level $W_c$ for the write signal to maximize the amplitude of the read-back signal by solution of the relationship $$W_c = W_o - KB_2/2B_3$$

where $W_o$ is an offset power level for the write signal, K is a step interval between adjacent write signal power levels, and $B_2$ and $B_3$ are parameters satisfying a least squares fit of a second order polynomial equation to data provided by the instruction means for correlating measurements of the amplitude of the read-back signal and the digital to analog converter settings.

17. A data processing program product as set forth in claim 16, wherein the drive memory unit is a disk drive, the moving media is a disk set for rotation in the disk drive.

18. A data processing program product as set forth in claim 17, the media further storing:
instruction means for providing a sequence of uniformly spaced integers as digital to analog converter settings.

19. A data processing program product as set forth in claim 18, wherein the disk drive further includes the disk having a plurality of tracks, each track having a plurality of radial sectors, the media further storing:

instruction means for selecting one of the tracks as a calibration track;

instruction means for marking each of a plurality of radial sectors at a selected digital to analog converter settings; and instruction means for causing each digital to analog converter setting to be used for at least two radial sectors.

20. A data processing program product as set forth in claim 19, the media further storing:

instructions means for identifying the measurement of the read-back signal having the largest amplitude, and its correlated digital to analog converter setting; and instruction means for selecting a subgroup of digital to analog converter settings and correlated read-back signal amplitude measurements centered on and included the identified measurement and its correlated digital to analog converter setting.

* * * * *

UNITED STATES PATENT AND TRADEMARK OFFICE
CERTIFICATE OF CORRECTION

PATENT NO. : 5,268,893

DATED : 7 December 1993

INVENTOR(S) : David E. Call, et al.

It is certified that error appears in the above-identified patent and that said Letters Patent is hereby corrected as shown below:

Column 5, line 36, please delete "20".

Signed and Sealed this

Seventh Day of June, 1994

Attest:

BRUCE LEHMAN

Attesting Officer

Commissioner of Patents and Trademarks